United States Patent
Damm, Jr. et al.

[15] 3,645,859
[45] Feb. 29, 1972

[54] DURABLE, ANTICORROSIVE AND ATTRACTIVE SURFACE COATINGS WITH ELECTRICAL CONTACT APPLICATION

[72] Inventors: Eugene P. Damm, Jr.; Allen W. Grobin, Jr., both of Poughkeepsie; Edwin H. Herel, Fishkill; David A. Radovsky, Poughkeepsie, all of N.Y.

[73] Assignee: International Business Machines Corporation, Armonk, N.Y.

[22] Filed: July 1, 1970

[21] Appl. No.: 51,701

[52] U.S. Cl. .............................. 204/35 N, 117/62, 252/388
[51] Int. Cl. .......................................................... C23f 17/00
[58] Field of Search .................. 204/35 N, 38 A, 42; 117/62; 148/6, 6.1; 252/388

[56] References Cited

UNITED STATES PATENTS 2,574,225  11/1951  Ringk et al. .......................... 204/35 N Primary Examiner—John H. Mack
Assistant Examiner—W. I. Solomon
Attorney—Hanifin and Jancin and Robert Lieber

[57] ABSTRACT

Electrically functional and decorative surface coatings—which are durable, attractive in appearance and resistant to corrosion and most importantly have long-lasting retention of foregoing properties under service conditions—are produced by reactive absorption of unsaturated oils into oxides of certain metals and metal alloys. The oil-treated oxide surfaces—especially after periods of in-service use—have lower contact impedance, higher conductivity, better retention of appearance and greater resistance to wear and corrosion than the untreated oxides. It appears that a highly stable interfacial compound is formed between the oil, the oxide coating and possibly the unoxidized basic metallic material, which differs considerably from the oxide in stability and general physical composition. Existence of this compound is evidenced by the heightened ability of the treated finish to withstand corrosion and scratching, and the tendency of the finish to actually harden and acquire greater wear resistance and permanence of appearance with age.

7 Claims, No Drawings 3,645,859

DURABLE, ANTICORROSIVE AND ATTRACTIVE SURFACE COATINGS WITH ELECTRICAL CONTACT APPLICATION

BACKGROUND OF THE INVENTION

1. Field of the Invention

The invention pertains the production and utilization in electrical equipment of metal finishes which possess long-life properties of: electrical functionality, decorativeness and uniformity of appearance, durability and anticorrosiveness. The process comprises formation of an oxide film upon the surface of a PO970-007 selected metal or metal alloy, and the absorption into said oxide film of an oil which reacts in an unexplained manner with the oxide to form a long-lived compound having electrical functionality, for electrical contact and conduction applications, and physical and decorational properties desirable for exterior equipment coatings. Materials so treated are utilized for example as finish coatings upon steel electronic equipment housings in order to provide attractive external finishes having electrical continuity for electromagnetic shielding of the internal electronics.

2. Description of the Prior Art

The decorational, anticorrosive and protective properties of certain oiled or lacquered metallic oxide finishes are well known and have been extensively investigated by workers in the metal finishing arts. Kerr and MacNaughton (Technical Publications of the International Tin Research and Development Counsel, Series A, No. 48, 1937, particularly pages 1–7), Fishlock ("Metal Coloring," Robert Draper LTD, 1962 especially pages 188–191 and 282–283) and others have disclosed the coloring and covering properties of anodic oxides of such metals as tin and aluminum, and the additional protection afforded by lacquering or oiling. However such finishes have not been considered for electrical contact and/or conduction applications; quite possibly because the untreated oxides are known to be unstable and the finishing oils and lacquers are known to be insulators.

Accordingly our invention resides in the discovery and application of the long-life electrical conduction and decorational appearance properties of certain oil treated metallic oxide surface coatings.

SUMMARY

The invention concerns recognition that reaction of certain metallic oxides with oils having specific unsaturated constituents produces distinctive long-lived compounds especially useful as decorative conductors of electricity which are exposed to view in electrical equipment. The low-contact impedance and other electrical and physical properties of these compounds are used to particular advantage in producing ground shield coatings upon frames and panels of electronic equipment. Other properties of these compounds are high-conductivity, durability, anticorrosiveness, resistance to scratching and attractive colored matte appearance.

A noteworthy aspect of the durability feature is that it improves with initial aging of the oil treated finish.

Treated metals which exhibit the foregoing properties after oxidation and oil treatment include tin, lead, indium, and alloys containing at least one of these.

Oils compounded with the foregoing metals in the finishing treatment include the linseed oils (raw, blown, boiled, heat bodied), tung oil, soybean oil, rapeseed oil, dehydrated castor oil, corn oil, peanut oil, lard oil, cottonseed oil, orticica oil, and sunflower seed oil. These are believed to be only representative of a larger class of vegetable, animal and other oils containing as common constituent an acid in the duodecanoic, octadecanoic, octadecadienoic, octadecatrienoic, eleostearic, licanic or docosoenic classes. Properties of the compound are treated in the following description of specific examples.

DETAILED DESCRIPTION

Material requirements in the electrical industry are becoming increasingly sophisticated and complex. For example the physically connected frames and covers of modular sections of data processing systems are required to serve both as protective housings with attractive external appearance and as electrically continuous electromagnetic shields. A requirement that touching sections present contact impedances less than one ohm to electrical signals in a frequency range from DC to above 30 MHz is not considered uncommon.

We have found that surface compounds formed in the manner described herein are capable of satisfying all of the foregoing electrical, protective and decorative requirements.

We have discovered that when tin, lead, indium and alloys containing at least one of these metals are anodized as taught by Kerr and MacNaughton above, to form a dark colored finish having decorative appearance, and then treated with an absorbed layer of oil, not only is the dried finish not oily to the touch but it possesses a number of interesting electrical, physical and decorational properties not coincidentally possessed by the untreated oxide or by any other materials known to us. We have noted especially that when unsaturated oils, that is oils having components with double or triple bonds, are utilized in such treatment the dried finish acquires and retains a pleasing finish and highly useful electrical contact impedance and conduction properties. More importantly the finish and electrical quality are highly stable even though the untreated material may be basically unstable with respect to these properties. Thus the oil-treated finishes have numerous potential applications not hitherto considered for the untreated material because of the known instability of the latter.

The treated oxide surfaces have color uniformity of a surprisingly high order and resistance to corrosion, scratching and other physical damage also of a surprisingly high order.

A possible explanation for the improved stability of the treated finish is that a chemical reaction occurs between the substrate, the anodic oxide layer and the unsaturated oil by which an electrically conductive new compound is formed. This appears to be unusual because the oils used and certain of the oxides are basically insulators. Thus we understand that the oil is not merely a pore closing agent.

It is of course not the intent here to claim that the formation of a compound between a metallic oxide layer and another substance is per se an inventive discovery. It has long been recognized that oxidized metals can be reacted with other substances to form compounds in structure from the untreated oxide. Representative of such recognition would be the disclosure for example in U.S. Pat. No. 2,574,225 by Ringk et al., concerning oxides of aluminum, magnesium, tin, zinc, and their alloys. When treated with 8-quinolinol or its salts these are said to form a compound having resistance to attack by bacteria fungus and the like, notwithstanding the absence of such property in the oxidized but untreated metal.

On the contrary our invention resides primarily in the recognition that the compounds formed by the particular treatments enumerated herein have a combination of high stability electrical, decorational and protectional coating properties, which is unique and especially desirable for exposed electrical conduction applications.

The following discussion of examples will help to illustrate the practice of this invention and the advantages derived therefrom. It should be understood however that the purpose of the discussion is only illustrative and not limiting.

EXAMPLES 1

Tin plate (.0006 inches thick) on steel substrate is anodically oxidized to a surface depth of 0.0001 inch by the method of Kerr and MacNaughton supra. The oxide outer layers of several samples are reacted with foregoing oils (the term "reacted" is employed for want of better terms to describe the desired effect which is the complete incorporation or absorption of the oil into the outer oxide layer leaving no excess of oil on the surface), excess oil being permitted to drain freely off the treated samples. Each oil is applied by immersion of the samples. The oil bath is at room temperature.

Electrical quality (contact impedance) and appearance are observed before and after exposure of the samples to standard accelerated environmental aging processes (77 days of cyclically repeated temperature humidity cycles: 4 hours at 77° F./50% RH, 4 hours at 150° F./90% RH, 16 hours at 150° F./50% RH) which are supposed to approximate closely in effect multiple years of field use under average in-service operational and environmental conditions. Tables I and II below indicate respectively sample properties before and after aging.

TABLE I.—PRE-AGED SAMPLES TIN OXIDE ON TIN ON STEEL

| | Sample number | | | | | | | | |
|---|---|---|---|---|---|---|---|---|---|
| | 1 | 2 | 3 | 4 | 5 | 6 | 7 | 8 | 9 |
| Treating oil | None* | Saturated* lubricating oil No. 2 | Boiled linseed oil | Tall oil | Refined soybean oil | Oiticia oil | Tung oil | Dehydrated castor oil | Rape seed oil |
| Contact impedance ohms at— | | | | | | | | | |
| 1MHz | 0.095 | 1.970 | 0.016 | 0.175 | 0.016 | 0.004 | 0.069 | 0.023 | 0.023 |
| 10MHz | 0.178 | 5.761 | 0.120 | 0.120 | 0.105 | 0.145 | 0.145 | 0.125 | 0.175 |
| 30 MHz | 0.470 | 0.836 | 0.380 | 0.340 | 0.300 | 0.360 | 0.360 | 0.350 | 0.500 |
| Appearance, dryness | Uniform black dull matte attractive finish, all samples. Sample No. 2 oily to touch; others dry | | | | | | | | |

*Denotes control sample.

TABLE II.—SAME SAMPLES AS TABLE I—AFTER ACCELERATED AGING PROCESS

| | Sample number | | | | | | | | |
|---|---|---|---|---|---|---|---|---|---|
| | 1 | 2 | 3 | 4 | 5 | 6 | 7 | 8 | 9 |
| Contact impedance ohms at— | | | | | | | | | |
| 1MHz | >1,000 | 0.247 | 0.025 | 0.150 | 0.046 | 0.060 | 0.080 | 0.052 | 0.034 |
| 10 MHz | 1,000 | 0.234 | 0.180 | 0.205 | 0.115 | 0.145 | 0.155 | 0.135 | 0.180 |
| 30 MHz | 1,000 | 0.389 | 0.480 | 0.380 | 0.310 | 0.360 | 0.370 | 0.360 | 0.500 |
| Appearance, dryness | (¹) | (²) | No change—these samples | | | | | | |

¹ Rusty, no black.
² Colorless metallic tin; still oily.

Observe electrical and physical instability of Sample No. 1 (untreated oxide) and physical instability (appearance deterioration) of Sample No. 2 (sample treated with highly saturated oil).

EXAMPLES 2

Lead oxide (0.0001 inches) on surface of lead sheet (0.005 inches) formed by anodizing process same as in Examples 1.

TABLE III

Lead oxide unaged samples—Examples 2*.

| Contact Impedance ohms at | Untreated (control) sample | Sample treated with boiled linseed oil |
|---|---|---|
| 1 MHz | >1,000 | 0.092 |
| 10 MHz | >1,000 | 0.145 |
| 30 MHz | >1,000 | 0.310 |
| Appearance | Reddish Black | Black Matte |

Observe poor electrical quality and appearance of control for electrical panel finish applications.

EXAMPLES 3

Oxide surface layer (0.0001 inches) in 5% indium, 95% lead (.003 inches) plate on copper sheet formed by anodizing process same as Examples 1.

TABLE IV

Unaged indium-lead oxide samples.

| Contact ohms at | Untreated | Boiled Linseed Oil |
|---|---|---|
| 1 MHz | 0.501 | 0.026 |
| 10 MHz | 0.950 | 0.145 |
| 30 MHz | 0.950 | 0.390 |
| Appearance | Black Matte | Black Matte |

Note superior electrical quality of treated sample.

EXAMPLES 5

Indium oxide (0.0001 inch) anodized on indium sheet (0.005 inch) per Examples 1. Pre- and postaging electrical qualities similar (less than 1 ohm) for untreated and boiled linseed oil reacted samples. However after aging untreated sample appearance reverted from black matte to metallic silvery color, whereas treated sample retained uniform black matte finish.

EXAMPLES 6

Black tin oxide (0.7 inches) on tin (0.7 inches) on steel. Results same as for Examples 1.

EXAMPLES 7

Black oxides of 60–40 tin-lead alloy and 37½–37½–25 tin-lead indium alloys, obtained by anodic treatment as in Examples 1, were found to possess similar electrical qualities (low-ohms contact impedance 1–30 MHz) with or without boiled linseed oil treatment, and before and after accelerated aging. However after aging, samples not treated with oil showed tendency to lose color. Where oil treated samples retained consistent appearance. Also tin-lead alloy samples not treated with oil had postaging contact impedance greater than 1 ohm but less than 10 ohms where all other samples gave corresponding impedance readings below 1 ohm.

Some of foregoing tin and tin alloy examples had small traces of impurities such as bismuth, antimony, nickel, etc. Control experiments with 99.99 percent pure tin oxide-tin indicated that such impurities do not affect conclusions to be drawn from oil treatment and aging process results considered above.

Of particular interest is the fact that the oil treated oxides above require and stably retain the above useful electrical properties and uniform matte appearance even in instances where the unoxidized material is a poor conductor.

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. An article having a surface possessing properties of low-electrical contact impedance, attractiveness, and corrosion resistance, all retained stably over extended periods of service usage, formed by the reaction product of an anodized surface layer of a metal selected from the class consisting of tin, lead, indium, and alloys containing at least one of the foregoing metals, with an absorbed oil having an unsaturated constituent.

2. In electrical equipment an exterior panel and frame finish coating comprising a conductive compound formed by reaction of an anodized layer of a metal with an absorbed layer of a reactive oil wherein said metal is selected from the class consisting of tin, lead, indium and alloys containing at least one of these metals and wherein the said oil has an unsaturated constituent.

3. Coating of claim 2 wherein said anodized layer is formed by anodic oxidization of a thin surface layer of said metal or metal alloy supported upon a substrate of another metal.

4. A process for treating surfaces composed of tin, lead, indium, or alloys formed from combinations thereof, in order to establish therein highly stable long term properties of anticorrosiveness, decorational appearance and low-electrical contact impedance comprising:
   oxidizing said surface;
   reacting the oxidized surface with an oil having an unsaturated component; and
   removing any residue of said oil which has not been reactively absorbed into said surface.

5. The process of claim 4 wherein the oxidizing step is accomplished by anodizing the surface.

6. A process for forming conductive, anticorrosive and decorative exterior surfaces in electrical equipment structures comprising:
   preparing a structure having an exterior surface formed of a metal in the class consisting of tin, lead, indium and alloys containing at least one of the foregoing metals;
   anodizing said exterior surface; and
   reacting said anodized surface with a material having a constituent acid in the class consisting of: duodecanoic, octadecanoic, octadecadienoic, octadecatrienoic, eleostearic, licanic and docosoenic acids.

7. A process according to claim 6 wherein said step of anodizing is permitted to proceed until said exterior surface acquires a black matte finish of pleasing appearance and wherein said reacting step comprises absorbing said material into the anodized surface and removing any excess of said material; said reacting step yielding a surface compound possessing stable electrical properties of low-contact impedance in the frequency range DC to 30 MHz. and uniform appearance throughout.

* * * * *

PO-1050
(5/69)

UNITED STATES PATENT OFFICE
CERTIFICATE OF CORRECTION

Patent No. 3,645,859          Dated February 29, 1972

Inventor(s) E. P. Damm, Jr., A. W. Grobin, Jr., E. H. Herel, D. A. Radovsky

It is certified that error appears in the above-identified patent and that said Letters Patent are hereby corrected as shown below:

Column 1, line 13, "PO-9-70-007" should be deleted.
Column 2, line 48, after the word "compounds" insert --differing--.
Column 3, line 68, after the word "control" insert --sample--.

Signed and sealed this 27th day of June 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,645,859      Dated February 29, 1972

Inventor(s) E. P. Damm, Jr., A. W. Grobin, Jr., E. H. Herel, D. A. Radovsky

It is certified that error appears in the above-identified patent and that said Letters Patent are hereby corrected as shown below:

Column 1, line 72, the word "duodecanoic" should be spelled --duodecenoic-- and the word "octadecanoic" should be spelled --octadecenoic--. Column 5, line 4, the word "require" should be --acquire--. Column 6, line 21, the word "duodecanoic" should be spelled --duodecenoic--. Column 6, line 22, the word "octadecanoic" should be spelled --octadecenoi( Signed and sealed this 2nd day of January 1973.

(SEAL)
Attest:

EDWARD M. FLETCHER, JR.
Attesting Officer

ROBERT GOTTSCHALK
Commissioner of Patents